United States Patent [19]

Meyer

[11] 3,813,100

[45] May 28, 1974

[54] CAM ACTION TANGENTIAL TRACKING TONE ARM PIVOT MECHANISM

[76] Inventor: Karl Arthur Meyer, 171 N. Atlantic Ave. Apt. 27, Western Springs, Ill. 32931

[22] Filed: Mar. 19, 1973

[21] Appl. No.: 342,824

[52] U.S. Cl. .............................................. 274/23 A
[51] Int. Cl. .............................................. G11b 3/28
[58] Field of Search ......................... 274/23 R, 23 A

[56] References Cited

UNITED STATES PATENTS

| | | | |
|---|---|---|---|
| 1,438,642 | 12/1922 | Graham | 274/23 A |
| 3,485,501 | 12/1969 | Baker | 274/23 R |

FOREIGN PATENTS OR APPLICATIONS

| | | | |
|---|---|---|---|
| 1,060,103 | 2/1967 | Great Britain | 274/23 |
| 116,163 | 6/1918 | Great Britain | 274/23 |
| 608,086 | 10/1970 | Italy | 274/23 |

*Primary Examiner*—Harry N. Haroian
*Assistant Examiner*—John W. Shepperd

[57] ABSTRACT

A cam action tangential tracking tone arm pivot assembly and more particularly an improved tangential tracking tone arm pivot assembly for phonographs, working on the principle of simultaneous rotation and linear motion of the pivot point to the correct geometric location. This is accomplished by a cam or camshaft to which the tracking tone arm is mounted and wherein said cam or camshaft is sensitively balanced to the prescribed tracking, by a movable and a fixed cam roller, and on the same plane by bearings or bushings for the least resistance to rotation.

5 Claims, 9 Drawing Figures

CAM ACTION TANGENTIAL TRACKING TONE ARM PIVOT MECHANISM

BACKGROUND OF THE INVENTION

1. Field of the Invention

This present invention relates to a tracking tone arm assembly for phonographs but more specifically to an improved tangential tracking tone arm assembly that can be used on either manual or automatic turn tables.

2. Description of Prior Art

Prior art is as described in the following United States Patents:

U.S. Pat. No. 2,380,727 Dann
U.S. Pat. No. 3,186,717 Churchill
U.S. Pat. No. 3,214,176 Morrison
U.S. Pat. No. 3,485,501 Baker

SUMMARY OF THE INVENTION

Playback distortion on phonographs has been a long standing problem. Expensive styli or needles are advertised to eliminate playback distortion. Record producers are exerting efforts to come up with better playing records, yet playback distortion still exists.

It is the main object of the present invention to eliminate playback distortion due to non-tangential tracking of the phonograph needle. Present day tracking tone arm pivot mechanisms are tangent at only one or two radii. The present invention insures the needle to be tangent to the record groove at all radii relative to the spindle or record center point. This is accomplished by continuously moving the tone arm pivot to the correct geometric location as the tone arm rotates toward the center of the playing record.

It is also an object to provide a geometrically correct tangential tracking tone arm assembly that can be adapted to either manual or automatic turn tables.

It is yet another object to provide a versatile tangential tracking tone arm assembly that can be custom mounted to turn tables or adapted to standard mounting, for the mounting design can be varied.

Another object of the present invention is to offer a tangential tracking tone arm assembly which lends itself to be manufactured using the latest materials and technology.

Further objects and advantages will become apparent as we continue the description with the aid of the accompanying illustrated drawings.

DESCRIPTION OF PREFERRED EMBODIMENTS

Figure 1:
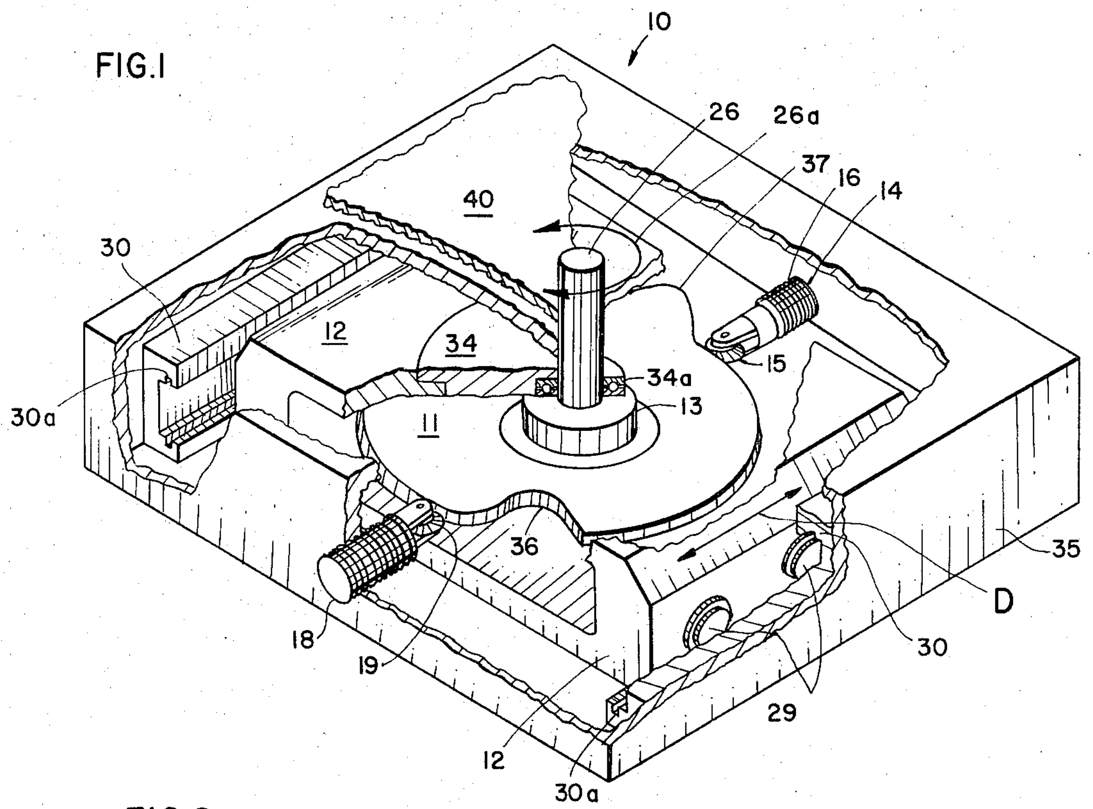
FIG. 1 is a perspective view with partial cut-away sections to show the assembly.
Figure 2:
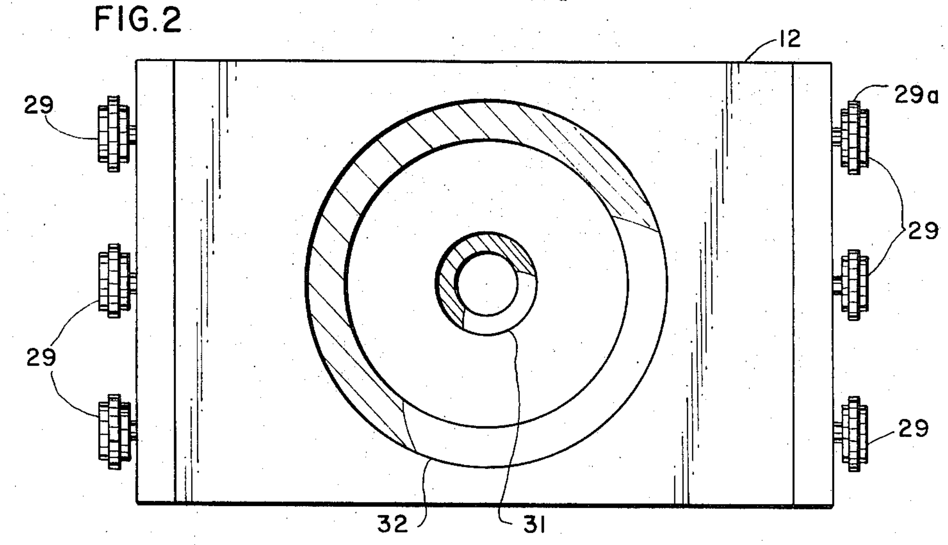
FIG. 2 is a top view of the cam carrier with rollers.
Figure 3:
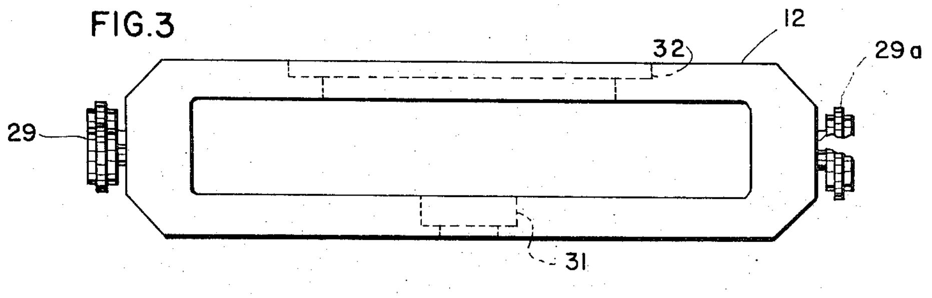
FIG. 3 is a side view of the cam carrier with rollers.
Figure 4:
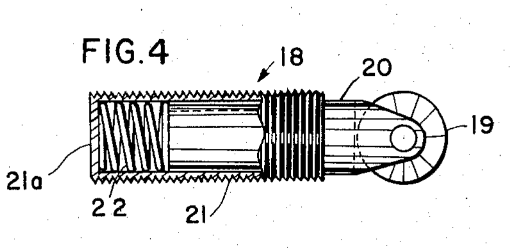
FIG. 4 is a partial sectional side view of the non-fixed roller assembly.
Figure 5:
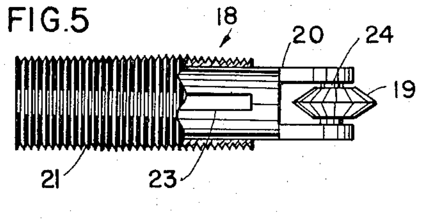
FIG. 5 is the other side view of the non-fixed roller assembly.
Figure 6:
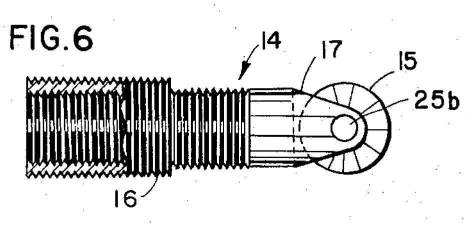
FIG. 6 is a side view of the fixed roller assembly.
Figure 7:
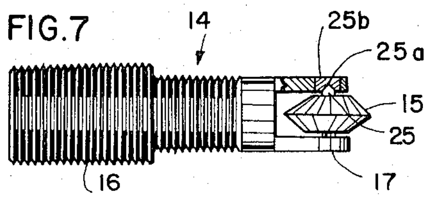
FIG. 7 is the other side view of the fixed roller assembly.
Figure 8:
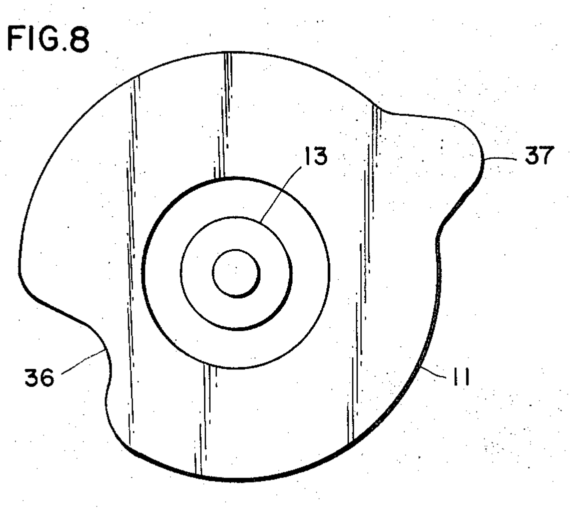
FIG. 8 is a top view of the cam assembly.
Figure 9:
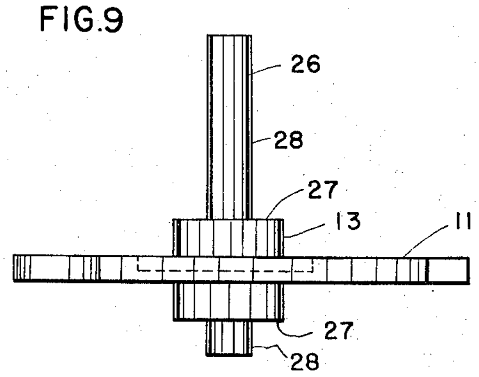
FIG. 9 is a side view of the cam assembly.

Referring now more particularly to the drawings, wherein is illustrated a cam action tangential tracking tone arm pivot mechanism assembly designated by the numeral 10. The tone arm assembly 10 consists of a geometric cam 11 assembled approximately midway onto the concentric shoulder 13 of the tone arm shaft 26, leaving surface 27 of the shoulder 13 and 28 of the shaft 26 as the bottom positioning and bearing surfaces. Said tone arm rotation as indicated by arrow 26*a*. A cam carrier and slider 12 with three rollers 29 affixed to the two opposite sides, and a positioning bearing hole counter bore 31 at the bottom, and larger positioning bearing hole with outside counter bore 32. Said counter bore accepting flanged plate 34. Said plate having bearing 34*a*. A fixed cam roller assembly 14 and a non-fixed roller assembly 18, roller track 30, housing 35, and part of turn table top shown at 40.

To insure tangential tracking of the needle to the phonograph record groove, cam 11, with geometric profiles 36 and 37, said profiles must be reversed so that roller assembly 18 contact point is reversed from roller assembly 14 contact point, and this arrangement brings about, in addition to tangential tracking, a zero torque or moment about the tone arm pivot point axis.

Cam 11 is rigidly assembled on shoulder 13 of shaft 26 and the entire assembly in turn is positioned into the cam carrier 12 by means of the bushings or bearings mounted on surfaces 27 and 28 of both top and bottom of shaft 26. (2 bushings or bearings used.)

The cam carrier 12 having rollers 29 positioned into roller track 30 with larger diameter 29*a* of said rollers 29 positioned into the trough-like undercuts 30*a*. This arrangement allows the cam carrier 12 and hence the cam 11 to have linear travel as indicated by the double arrowed line D.

Cam roller assemblies 14 and 18 are positioned on housing 35, in such a manner that their longitudinal axis is parallel with the direction of travel, D, of the cam carrier 12.

Fixed cam roller assembly 14, which is positioned approximately midway between the length and width of the corresponding side of the cam carrier 12, consists of a knife edge roller 15 held to the roller holder 17 by pointed pivot pin 25, points 25*a* of said pivot, bearing on insert 25*b*. Shank of roller holder 17 being threaded into a female threaded sleeve 16 to allow adjustment and sleeve 16 rotatably affixed to the housing 35.

The non-fixed cam roller assembly 18 which is positioned opposite fixed cam roller assembly 14 on opposite side of cam carrier 12, consists of a knife edge roller 19 held to roller holder 20 by pointed pivot pin 24. Pointed pivot pin constructed identical to fixed cam roller assembly 14. Shank of the roller holder 20 fits reasonably freely into sleeve 21 with key groove 23 accepting the key of shank of the roller holder 20. Compression spring 22, is trapped between the closed bottom 21*a* of said sleeve and bottom end of shank of said roller holder 20. This arrangement allows the roller holder 20, roller 19 to slide freely within said sleeve 21. The spring 22 applies the force necessary to keep cam 11 centered between fixed cam roller assembly 14 and non-fixed cam roller assembly 18.

In operation, the profile built into cam 11 determines the linear travel of the pivot point of the tone arm and with the arrangement described above, insures tangential tracking throughout, at the same time maintaining a zero torque or moment about the tone arm pivot point.

I claim:

1. A cam action tangential tracking tone arm pivot mechanism intended for mounting beside the rim of a phonograph turn table whereby one end of the tone arm is connected pivotally to the pivot mechanism with the opposite end of the tone arm projecting outwardly therefrom and supporting a stylus adapted to engage a record on the phonograph, the pivot mechanism adapted to continuously move the tone arm pivot to the correct geometric location as the stylus is moved by the record grooves toward the center of the record and the tone arm moving pivotally therewith, the tone arm pivot being disposed at all times such that the stylus portion of the tone arm is always tangentially disposed relative to the specific record groove in which the stylus is engaged at any particular time, the pivot mechanism comprising:

a hollow box-like rectangular housing having a top surface, a bottom surface, opposed front and back surfaces, and opposed side surfaces, said surfaces defining interiorly thereof a hollow compartment;

a pair of transversely spaced apart longitudinally extending U-shaped channel members defining tracks along each of the interior surfaces of said housing side members and extending between opposite end members thereof, the channels of said tracks disposed in confronting parallel relationship to each other;

a rectangularly shaped cam carrier having a substantially flat horizontal top member and a substantially flat horizontal bottom member each spaced vertically apart and having their adjacent side edges interconnected by vertically extending members, a longitudinally elongated open ended chamber extending intermediate said top and bottom surfaces of said carrier member;

a plurality of roller members extending horizontally outwardly of each of said carrier side wall members and adapted to rollingly engage within said track members for guiding said carrier member in reciprocal longitudinal movement therealong;

an elongated cylindrical vertically extending tone arm pivot shaft disposed approximately centrally of said carrier and extending vertically therethrough from said carrier bottom member through said compartment and outwardly of said carrier top member in a manner to project through a suitable opening in the housing top surface for supporting connection to an end of said tone arm, said tone arm shaft supported on said carrier for rotative movement about its longitudinal axis relative thereto;

a substantially flat horizontally disposed cam member mounted on its axis to said tone arm shaft and disposed in said carrier chamber, said cam member having a top surface, a bottom surface, and an outer edge surface defining a preselected geometrical profile therealong;

a first cam roller assembly mounted to an interior surface of one of said housing end walls and projecting outwardly therefrom in a direction substantially radial to said tone arm shaft and having a roller mounted at the end thereof in rolling engagement with said edge surface of said cam, said first cam roller assembly being fixed relative to said housing and having means for selectively adjusting the spacing of said roller from said housing;

a second cam roller assembly disposed in substantial alignment with said first roller assembly and substantially radial to said tone arm shaft and mounted to the interior surface of said housing end wall member opposite said housing end wall member to which said first cam roller assembly is mounted, said second cam roller assembly comprising a base member and a roller holder member, said base member being of a tubular member having a closed back end in mounted engagement with said housing end wall and projecting outwardly therefrom to terminate at an open front end which surrounds a bore extending through said base member, said roller holder comprising an elongated body member of a size and configuration adapted to be telescopically received in said bore for reciprocal movement relative thereto and having the end projecting outwardly of the bore adapted to rotatably hold a cam following roller therein with said roller being in engagement with said edge surface of said cam, and a coiled spring means disposed in said bore intermediate said back end of said base member and the adjacent end of said roller holder member and operative to effect a continuous axial outward force on said roller holder member to urge the same in a direction outwardly of said bore;

whereby said cam is maintained between said first and second cam roller assemblies with rotation of the tone arm shaft about its axis being effected as said stylus moves inwardly of a record during the play thereof on said phonograph turntable, this rotating movement of said tone arm shaft effecting the simultaneous movement of said cam with the rotating cam profile acting between said roller members in a manner to effect the linear movement of said cam carrier along said track to thus simultaneously effect the continuous moving of the tone arm shaft linearly relative to said housing such that the correct geometric location of the tone arm pivot is always maintained as the tone arm rotates toward the center of the playing record such that the tone arm remains tangent at all times to the groove of the record being engaged by the stylus.

2. The cam action tangential tracking tone arm pivot mechanism as set forth in claim 1 wherein said geometric profile of said cam is derived geometrically and mathematically to effect a linear movement of the axis of the tone arm shaft relative to the phonograph record being played to maintain said tone arm tangential at all times to said playing portion of said record.

3. The cam action tangential tracking tone arm pivot mechanism as set forth in claim 2 wherein said cam is provided with a first geometric profile disposed adjacent said first cam roller assembly and a second geometric reversed profile adapted to be engaged and followed by said second cam roller assembly, and wherein said second reversed profile of said cam in conjunction with said first profile of said cam provides a zero torque or moment of forces applied by said roller of said first cam roller assembly and said roller of said second roller assembly about said tone arm shaft pivot axis.

4. The cam action tangential tracking tone arm pivot mechanism as set forth in claim 3 wherein said second cam roller assembly further comprises guide means formed integrally with said bore and extending longitudinally along an interior surface thereof from end-to-end thereof, and follower means formed integrally with said roller holder member and extending longitudinally therealong in a manner to engage said guide means for guiding said reciprocal axial movement of said roller holder member relative to said base member in a manner maintaining said roller disposed substantially horizontally relative to said cam for proper engagement of said roller circumferal edge surface with said cam edge surface.

5. The cam action tangential tracking tone arm pivot mechanism as set forth in claim 4 wherein said plurality of roller members supporting said cam carrier for linear movement along said tracks comprise a first wheel portion and a second wheel portion disposed concentrically therewith and substantially centrally thereof, said second wheel portion being of a diameter greater than said first wheel portion, and said track being of an elongated rectangular shape having a vertical back surface and depending horizontal top and bottom surfaces, the spacing between said top and bottom surfaces being slightly greater than the diameter of said first wheel portion with the depth of each track being slightly greater than the depth of each wheel such that said first wheel portion is adapted to be received in said track in a resting manner on said bottom horizontal surface in a manner to roll therealong, said top and bottom track surfaces each having formed approximately centrally thereof and extending longitudinally therethrough an elongated rectangular slot of a width slightly greater than the width of said second wheel portion, the spacing between the back surfaces of said slots being slightly greater than the diameter of said second wheel portion such that said second wheel portion will be engaged in said slots when said first wheel portion is engaged on said track bottom surface whereby said second wheel portion will guide the linear movement of said cam carrier member along said track to maintain an aligned position of said cam carrier while permitting free linear movement thereof by action of said cam edge surface against said rollers of said first and second cam roller assemblies.

* * * * *

UNITED STATES PATENT OFFICE

CERTIFICATE OF CORRECTION

Patent No. 3813100 Dated May 28, 1974

Inventor(s) Karl Arthur Meyer

It is certified that error appears in the above-identified patent and that said Letters Patent are hereby corrected as shown below:

[76] Inventor: Karl Arthur Meyer, 171 N. Atlantic Ave. Apt. 27, Cocoa Beach, Fla. 32931

Signed and sealed this 19th day of November 1974.

(SEAL)
Attest:

McCOY M. GIBSON JR.
Attesting Officer

C. MARSHALL DANN
Commissioner of Patents